United States Patent
Nakajima et al.

(10) Patent No.: US 9,851,846 B2
(45) Date of Patent: Dec. 26, 2017

(54) INPUT DEVICE AND METHOD OF OPERATING INPUT DEVICE

(71) Applicant: ALPS ELECTRIC CO., LTD., Tokyo (JP)

(72) Inventors: Satoshi Nakajima, Miyagi-ken (JP); Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/095,988

(22) Filed: Apr. 11, 2016

(65) Prior Publication Data

US 2016/0334932 A1 Nov. 17, 2016

(30) Foreign Application Priority Data

May 14, 2015 (JP) ................................ 2015-099022

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ........ G06F 3/0418; G06F 3/044; G06F 3/041; G06F 3/0416; G06F 3/0414; G06F 2203/04108; G06F 2203/04105; G06F 2203/04106
See application file for complete search history.

(56) References Cited

U.S. PATENT DOCUMENTS

| 4,550,221 | A | * | 10/1985 | Mabusth | G06F 3/03547 178/18.06 |
| 5,525,980 | A | * | 6/1996 | Jahier | G06F 3/044 341/22 |
| 7,834,860 | B2 | * | 11/2010 | Muranaka | G06F 3/044 178/18.01 |
| 8,970,521 | B2 | * | 3/2015 | Chiu | G06F 3/044 178/18.01 |

(Continued)

FOREIGN PATENT DOCUMENTS

| CN | 104423753 | 3/2015 |
| JP | 2010-257046 | 11/2010 |

(Continued)

OTHER PUBLICATIONS

European Search Report from European Application No. 16165901.6 dated Nov. 8, 2016.

(Continued)

*Primary Examiner* — Tom Sheng
(74) *Attorney, Agent, or Firm* — Beyer Law Group LLP

(57) ABSTRACT

An input device includes a measurement unit configured to measure a physical quantity according to an operation including at least one of touch of an operating object and proximity of the operating object, a determination unit configured to determine an operation state including an operation existence state and an operation nonexistence state, on the basis of at least a base value and the physical quantity, and a base value updating unit configured to update the base value using the physical quantity when a magnitude of a change in the physical quantity per predetermined time falls within a predetermined range, during an operation existence period in which the operation state is the operation existence state.

6 Claims, 10 Drawing Sheets

(56) References Cited

U.S. PATENT DOCUMENTS

| | | | |
|---|---|---|---|
| 9,158,423 B2* | 10/2015 | Lee | G06F 3/044 |
| 9,529,475 B2* | 12/2016 | Zhou | G06F 3/0418 |
| 9,645,639 B2* | 5/2017 | Jang | G06F 3/011 |
| 2014/0043287 A1* | 2/2014 | Nakajima | G06F 3/044 |
| | | | 345/174 |
| 2014/0092033 A1 | 4/2014 | Chang et al. | |
| 2014/0347317 A1 | 11/2014 | Tanaka | |
| 2015/0002459 A1* | 1/2015 | Watanabe | G06F 3/0418 |
| | | | 345/174 |
| 2015/0268764 A1* | 9/2015 | Miyahara | G06F 3/0416 |
| | | | 345/174 |
| 2015/0302810 A1* | 10/2015 | Yumoto | G06F 3/044 |
| | | | 345/206 |
| 2015/0379913 A1* | 12/2015 | Imai | G06F 3/0416 |
| | | | 345/174 |
| 2015/0379914 A1* | 12/2015 | Imai | G09G 3/20 |
| | | | 345/204 |
| 2016/0069767 A1* | 3/2016 | Ishiba | G06F 3/0414 |
| | | | 702/98 |
| 2016/0139734 A1* | 5/2016 | Nakajima | G06F 3/044 |
| | | | 345/174 |
| 2017/0075482 A1* | 3/2017 | Imai | G06F 3/041 |

FOREIGN PATENT DOCUMENTS

| | | |
|---|---|---|
| JP | 2014-229284 | 12/2014 |
| KR | 10-2014-0063018 | 5/2014 |

OTHER PUBLICATIONS

"Proximity Capacitive Touch Sensor Controller" Freescale Semiconductor Technical Data—An Energy Efficient Solution by Freescale, MPR121, p. 1-27, Rev 4, Sep. 2010.

"Jitter and False Touch Detection", http://www.nxp.com/docs/en/application-note/AN3892.pdf, MPR121, Rev 1, Mar. 2010, Downloaded Sep. 6, 2017.

"Baseline System", http://www.nxp.com/docs/en/application-note/AN3891.pdf, MPR121, Rev 1, Mar. 2010, Downloaded Sep. 7, 2017.

* cited by examiner

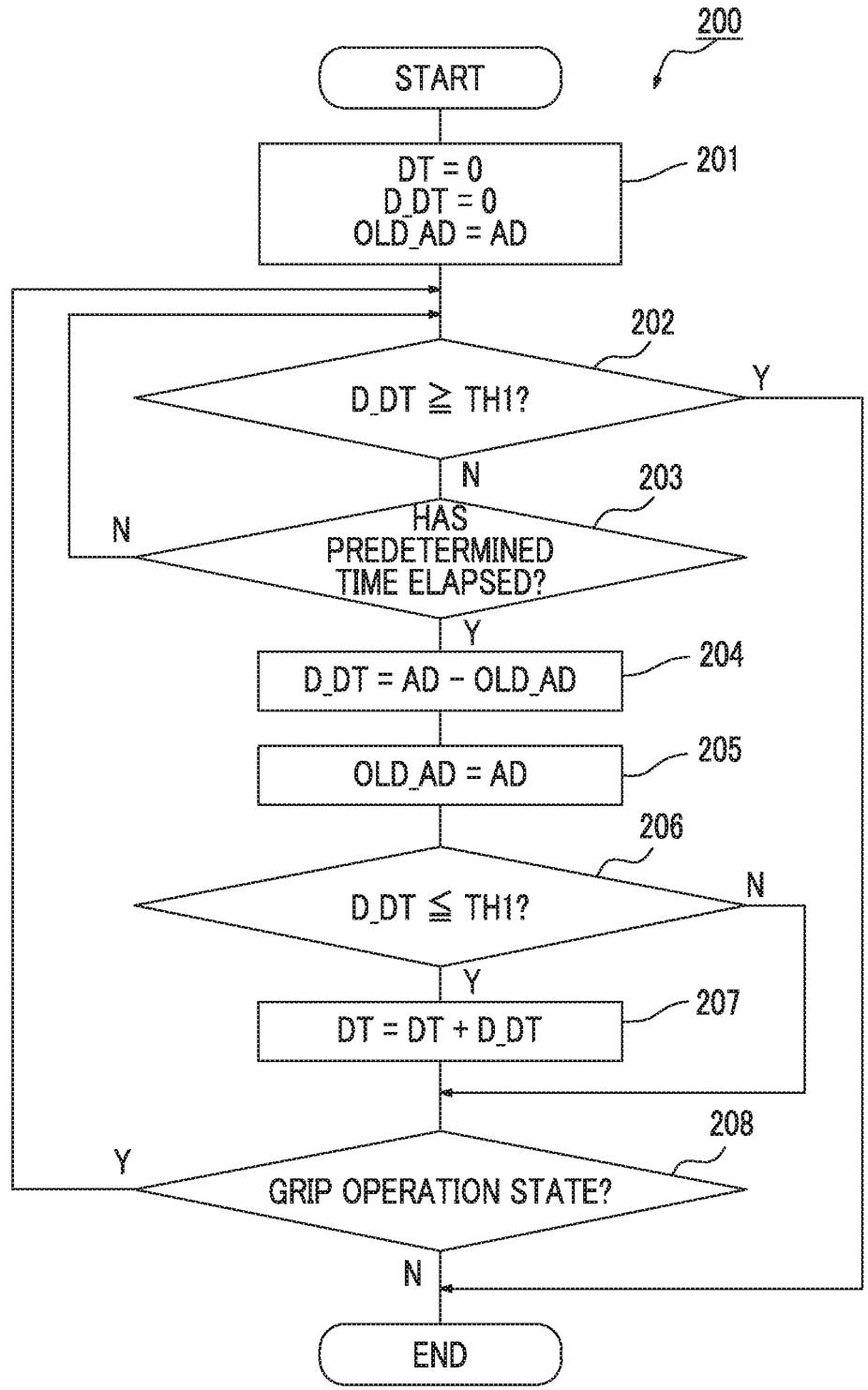

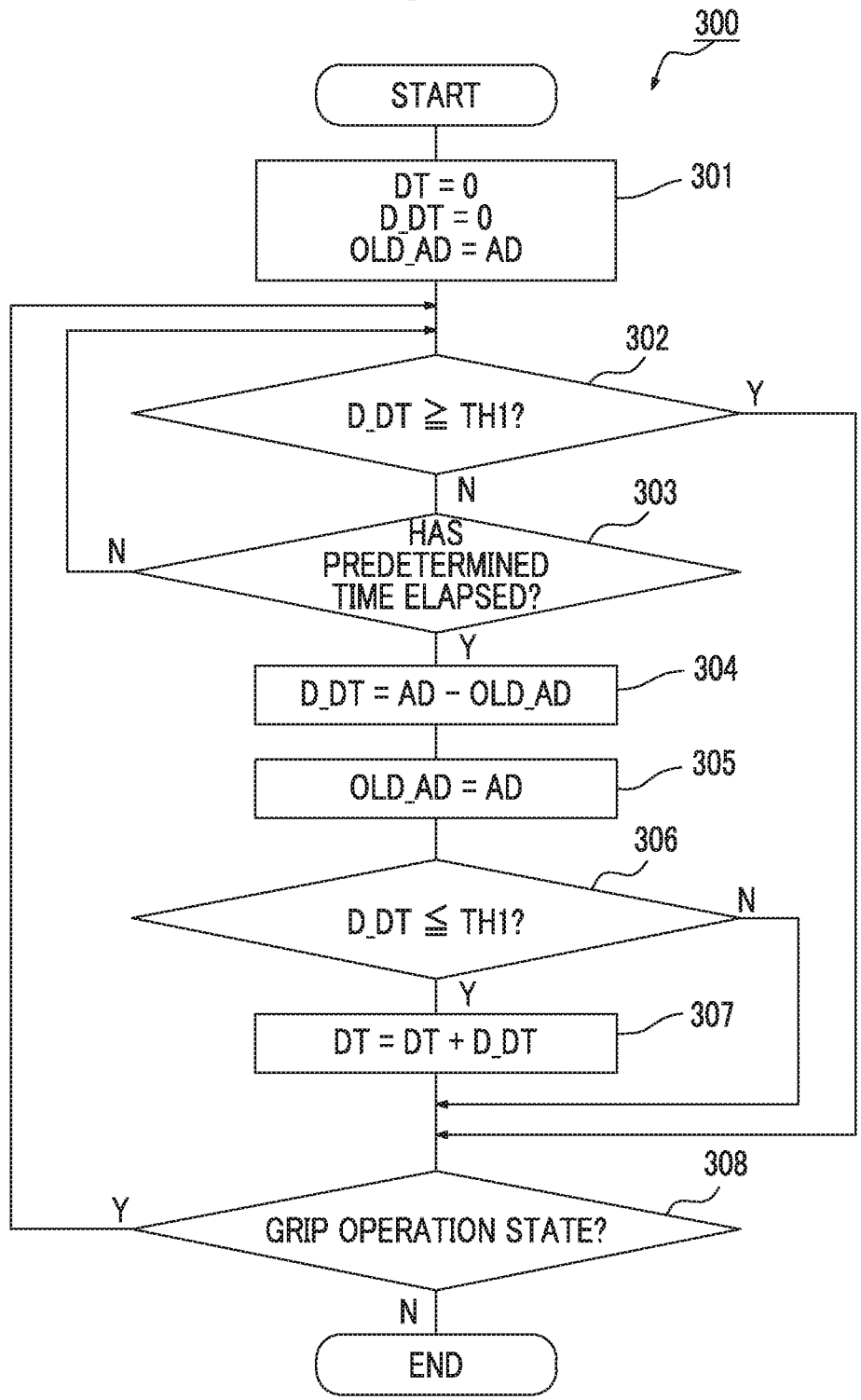

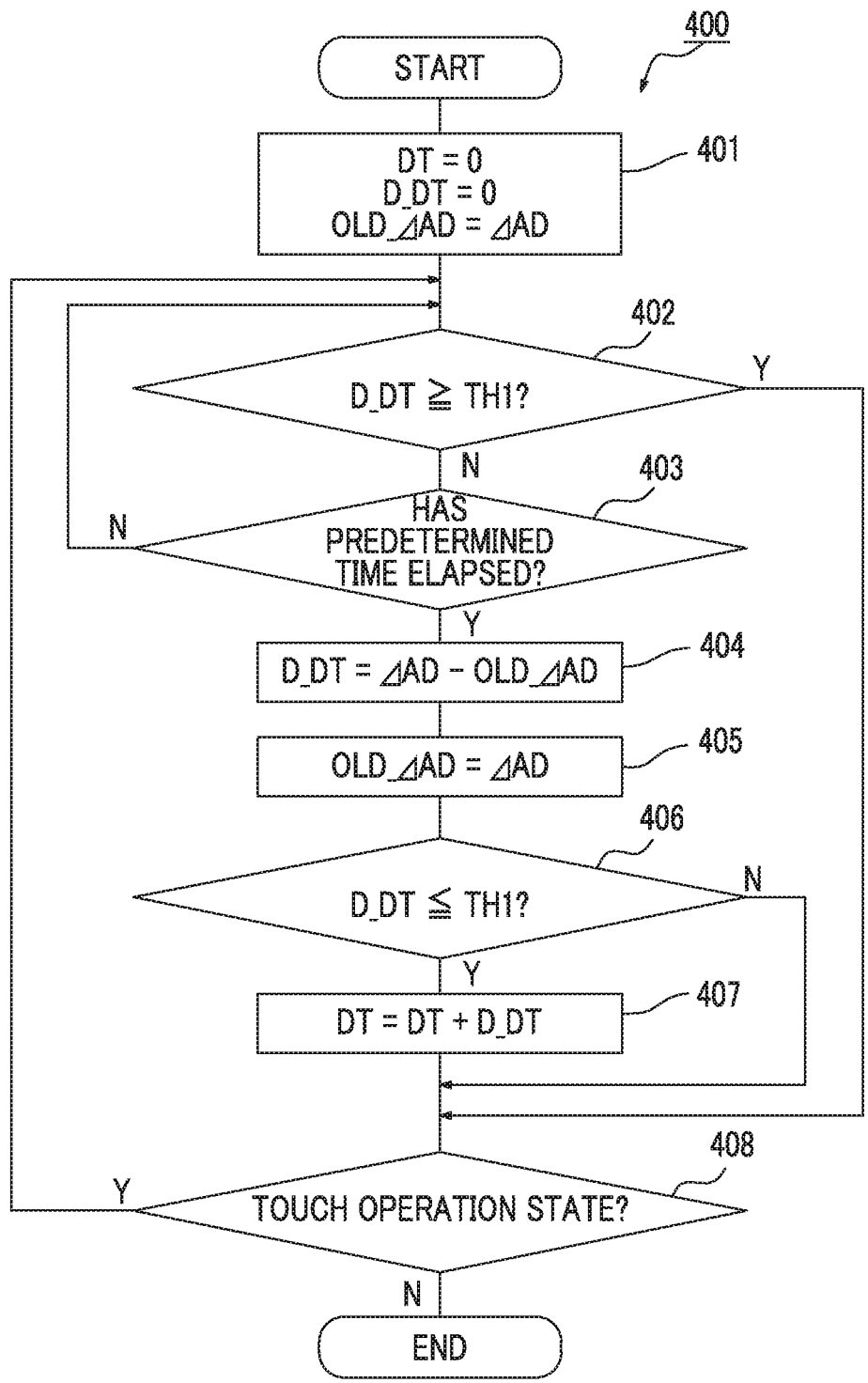

INPUT DEVICE AND METHOD OF OPERATING INPUT DEVICE

CLAIM OF PRIORITY

This application claims benefit of Japanese Patent Application No. 2015-099022 filed on May 14, 2015, which is hereby incorporated by reference.

BACKGROUND OF THE INVENTION

1. Field of the Invention

The present invention relates to an input device and a method of operating an input device.

2. Description of the Related Art

In input devices including a capacitance sensor that measures capacitance as a physical quantity, an operation of the capacitance sensor using a finger is detected by observing a change in the capacitance of the capacitance sensor on the basis of a predetermined base value. The capacitance which is output from the capacitance sensor fluctuates with a change in the environment, and thus there may be concern of the input device erroneously detecting an operation using a finger. The input devices of the related art cope with a fluctuation in capacitance due to a change in the environment by updating a base value when a finger does not touch the capacitance sensor.

Japanese Unexamined Patent Application Publication No. 2010-257046 is an example of the related art.

When a finger touches the capacitance sensor, the input devices of the related art are required to recognize an operation and thus do not update the base value. However, since a change in the environment occurs even while a finger touches the capacitance sensor, there is a problem of an operation using a finger not being correctly determined. For example, in a case where capacitance which is detected by the capacitance sensor gradually increases with a change in ambient temperature, the capacitance is not reduced to the base value even when the capacitance is reduced at the time of a finger being removed. For this reason, it may be erroneously determined that a finger is not removed.

SUMMARY OF THE INVENTION

The present invention provides an input device and a method of operating an input device which are capable of reducing the erroneous determination of an operation even when a physical quantity measured during an operation existence period changes with a change in the environment.

According to the present invention, there is provided an input device configured to detect an operation including at least one of touch of an operating object and proximity of the operating object. The input device includes a measurement unit configured to measure a physical quantity according to the operation, a determination unit configured to determine an operation state including an operation existence state and an operation nonexistence state, on the basis of at least a base value and the physical quantity, and a base value updating unit configured to update the base value using the physical quantity when a magnitude of a change in the physical quantity per predetermined time is within a predetermined range, during an operation existence period in which the operation state is the operation existence state.

According to such a configuration, since the base value can be updated during the operation existence period, it is possible to reduce the erroneous determination of an operation even when a physical quantity measured during the operation existence period changes with a change in the environment.

Preferably, in the input device of the present invention, during the operation existence period, the base value updating unit updates the base value on the basis of at least the physical quantity and the base value which has been previously updated during the operation existence period.

According to such a configuration, since the base value can be updated over time during the operation existence period, it is possible to more accurately follow a change in a physical quantity due to a change in the environment.

Preferably, in the input device of the present invention, during the operation existence period, the base value updating unit updates the base value using a correction value obtained by accumulating a difference in the physical quantity at a different point in time.

According to such a configuration, since the base value can be updated over time during the operation existence period, it is possible to more accurately follow a change in a physical quantity due to a change in the environment.

Preferably, in the input device of the present invention, the base value updating unit terminates the updating during the operation existence period in a case where the magnitude of a change in the physical quantity per predetermined time falls outside of the predetermined range.

According to such a configuration, it is possible to more accurately follow a change in a physical quantity due to a change in the environment by reducing the influence of an operation or noise on the base value.

Preferably, in the input device of the present invention, the base value updating unit does not use the physical quantity, in a case where the magnitude of a change in the physical quantity per predetermined time falls outside of the predetermined range, in updating the base value, and continues the updating even after the magnitude of a change in the physical quantity per predetermined time falls outside of the predetermined range.

According to such a configuration, since the influence of an operation or noise on the base value can be reduced, and the base value can be updated additionally even after an operation or noise occurs, it is possible to reduce the erroneous determination of an operation over a longer period of time.

Preferably, in the input device of the present invention, the measurement unit measures each of the physical quantities at a plurality of positions, the determination unit determines the operation state using at least one of the physical quantities at the plurality of positions, and the base value updating unit updates the base value using at least one of the physical quantities at the plurality of positions.

According to such a configuration, physical quantities of a plurality of positions are measured, thereby allowing the base value to be updated more accurately in consideration of the positions.

Preferably, in the input device of the present invention, the base value updating unit updates the base value using a minimum value of a difference between the physical quantities at the plurality of positions and the base value.

According to such a configuration, since a physical quantity at a position in a state close to operation nonexistence can be used, it is possible to more accurately follow a change in a physical quantity due to a change in the environment.

Preferably, the input device of the present invention further includes a plurality of capacitance generation units having their capacitance changed in accordance with the operation. The plurality of positions are disposed in a matrix, and the measurement unit measures the capacitance as the physical quantity.

According to such a configuration, it is possible to more accurately update the base value by measuring capacitance at a plurality of positions.

Preferably, in the input device of the present invention, during an operation nonexistence period in which the operation state is the operation nonexistence state, the base value updating unit updates the base value on the basis of at least the physical quantity and the base value which has been previously updated during the operation nonexistence period.

According to such a configuration, since the base value can be updated during the operation existence period and the operation nonexistence period, it is possible to reduce the erroneous determination of an operation even when a physical quantity changes due to a change in the environment.

Preferably, according to the present invention, there is provided a method of operating an input device configured to detect an operation including at least one of touch of an operating object and proximity of the operating object. The method includes a step of determining an operation state including an operation existence state and an operation nonexistence state, on the basis of at least a base value and a physical quantity according to the operation, and a step of updating the base value on the condition that a magnitude of a change in the measured physical quantity per predetermined time falls within a predetermined range, during an operation existence period in which the operation state is the operation existence state.

According to such a method, it is possible to reduce the erroneous determination of an operation even when a physical quantity measured during the operation existence period changes with a change in the environment.

BRIEF DESCRIPTION OF THE DRAWINGS

FIG. 2 is a flow diagram illustrating a first correction value deriving method of the input device shown in FIG. 1A.

FIG. 4 is a flow diagram illustrating a second correction value deriving method of an input device according to a second embodiment of the present invention.

FIG. 6 is a flow diagram illustrating a third correction value deriving method of an input device according to a third embodiment of the present invention.

DESCRIPTION OF THE PREFERRED EMBODIMENTS

First Embodiment

Hereinafter, an input device according to a first embodiment of the present invention will be described.

Figure 1A:
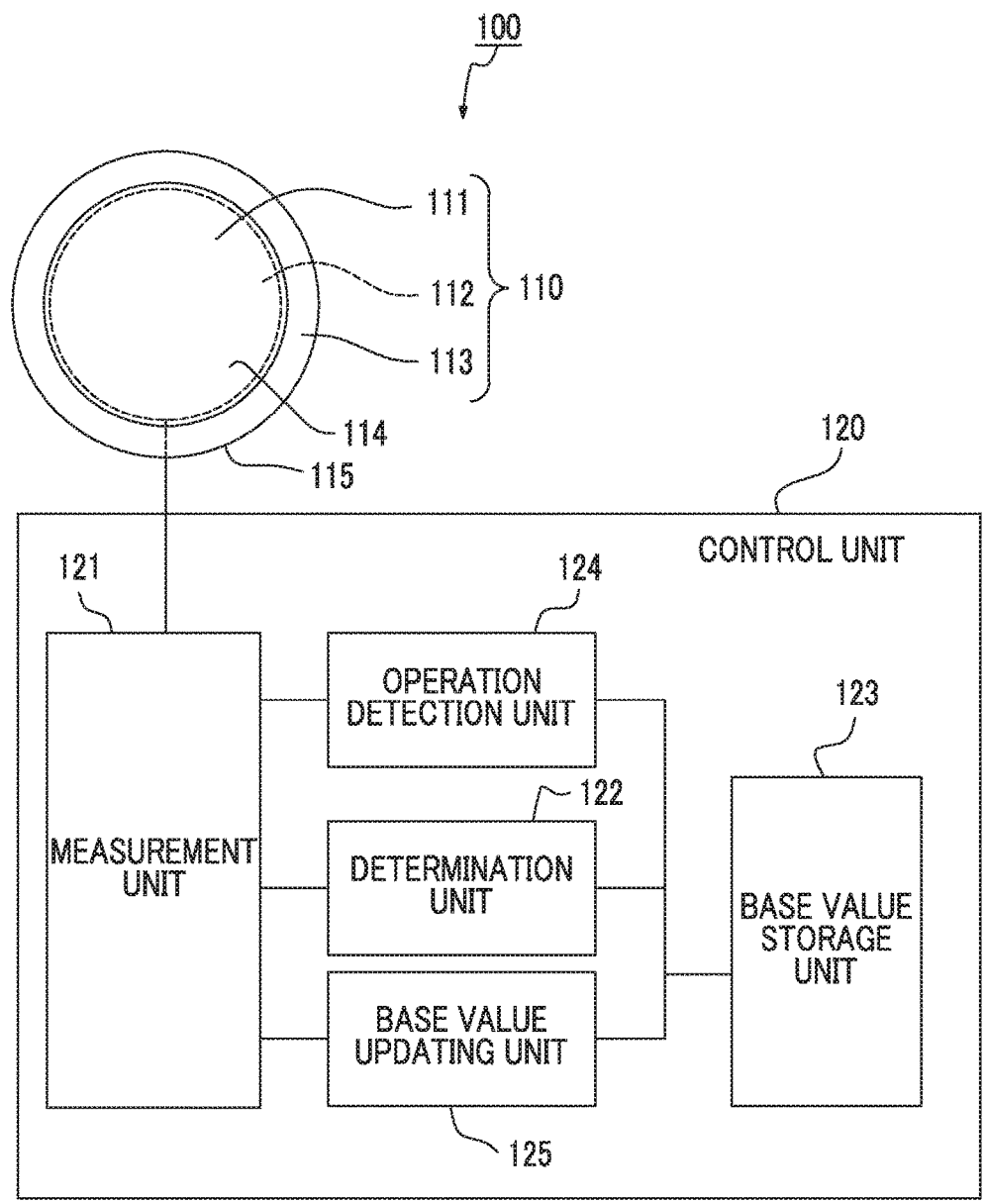
FIG. 1A is a configuration diagram illustrating an input device according to a first embodiment of the present invention.

As shown in FIG. 1A, an input device 100 of the present embodiment includes an operating unit 110 and a control unit 120. In FIG. 1A, the operating unit 110 is shown as a schematic plan view, and the control unit 120 is shown as a block diagram.

The operating unit 110 includes a touch operating unit 111, a sensor unit 112, and a grip portion 113. The touch operating unit 111 is disk-shaped, and has a flat touch surface 114. The sensor unit 112 is on the opposite side to the touch surface 114, and is disposed in parallel to the touch surface 114. That is, when a human finger touches the touch surface 114, the touch operating unit 111 is located between the finger and the sensor unit 112. The grip portion 113 is approximately cylinder-shaped, and is rotatable along the outer circumference of the touch operating unit 111. An outer circumferential curve 115 of the touch operating unit 111 is covered with a conductive material, and acts as a floating electrode with respect to the sensor unit 112.

Figure 1B:
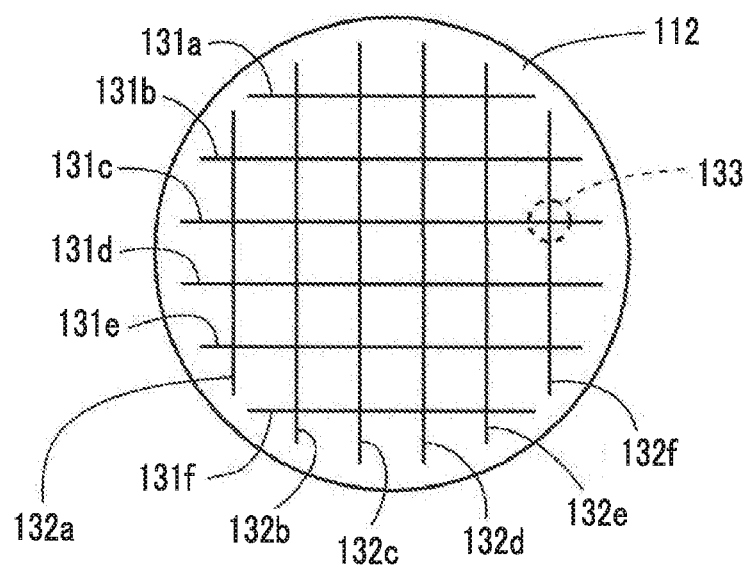
FIG. 1B is a schematic plan view illustrating a sensor unit of the input device shown in FIG. 1A.

As shown in FIG. 1B, the sensor unit 112 includes a plurality of horizontal electrode lines 131a to 131f (hereinafter, called the horizontal electrode lines 131 collectively) and a plurality of vertical electrode lines 132a to 132f (hereinafter, called the vertical electrode lines 132 collectively). The horizontal electrode lines 131 are disposed in parallel to each other, are disposed in parallel to the touch surface 114 of FIG. 1A, and are disposed at a first distance from the touch surface 114. The vertical electrode lines 132 of FIG. 1B are disposed in parallel to each other, are disposed in parallel to the touch surface 114 of FIG. 1A, and are disposed at a second distance from the touch surface 114. When seen from the touch surface 114 side of FIG. 1A, the horizontal electrode lines 131 and the vertical electrode lines 132 of FIG. 1B are disposed so as to be at right angles to each other, but do not come into contact with each other because the first distance and the second distance are different from each other. A plurality of regions to which each of the horizontal electrode lines 131 and each of the vertical electrode lines 132 come close are called capacitance generation units 133. In FIG. 1B, only one capacitance generation unit 133 is shown for the purpose of easy viewing, but the capacitance generation units 133 are disposed in a matrix, as is obvious from FIG. 1B. An operating object is capacitively coupled to the horizontal electrode lines 131 and the vertical electrode lines 132, and thus electrical signals of the horizontal electrode lines 131 and the vertical electrode lines 132 are changed.

Meanwhile, the touch surface 114 may not necessarily be plane, and may not be disk-shaped. The capacitance generation unit 133 may not necessarily be disposed on a plane surface. It is preferable that the capacitance generation units 133 are disposed in a matrix substantially along the touch surface 114, but the capacitance generation units 133 may be disposed in other forms. The grip portion 113 may not necessarily be approximately cylinder-shaped.

The grip portion 113 is not provided with capacitance generation units for exclusive use. However, since a floating electrode of the outer circumferential curve 115 of the grip portion 113 influences the horizontal electrode lines 131 and the vertical electrode lines 132 due to capacitive coupling, an operation of the grip portion 113 is detected by the sensor unit 112 disposed along the touch surface 114.

Meanwhile, in the present embodiment, the operation includes at least one of an operating object such as a human hand or finger which is capacitively coupled between the horizontal electrode lines 131 and the vertical electrode lines 132 coming into contact with the operating unit 110 and coming close to the operating unit 110.

In the present embodiment, an operation state includes an operation nonexistence state in which the operating unit 110 is not operated and an operation existence state in which the operating unit 110 is operated. The operation existence state includes a touch operation state in which the grip portion 113 is not operated and the touch surface 114 is operated, and a grip operation state in which the touch surface 114 is not operated and the grip portion 113 is operated.

As shown in FIG. 1A, the control unit 120 includes a measurement unit 121, a determination unit 122, a base value storage unit 123, an operation detection unit 124, and a base value updating unit 125. Each component of the control unit 120 is constituted by an analog circuit and a digital circuit. At least some of the components of the control unit 120 may be realized by a programmable element. For example, these components may be realized by a central processing unit and a storage device.

The measurement unit 121 operates in a plurality of types of measurement modes for determining any operation state of the operation existence state and the operation nonexistence state. In each of the measurement modes, the measurement unit 121 applies at least one electrical signal of a current and a voltage to one or a plurality of horizontal electrode lines 131 and vertical electrode lines 132 of FIG. 1B in a predetermined pattern, and measures a change in at least one electrical signal of a current and a voltage appearing in one or a plurality of horizontal electrode lines 131 and vertical electrode lines 132, to thereby generate a detection signal relevant to capacitance in association with the positions of the capacitance generation units 133.

A method of generating a detection signal relevant to capacitance in the vicinities of the positions of the capacitance generation units 133 in association with the respective positions has been hitherto known, and thus the description thereof will not be given. For example, the detection signal of the present embodiment is a signal increasing in magnitude with an increase in capacitance between a finger and the horizontal electrode lines 131 and the vertical electrode lines 132. In the present embodiment, the capacitance between the finger and the horizontal electrode lines 131 and the vertical electrode lines 132 increases as a distance between the finger and the horizontal electrode lines 131 and the vertical electrode lines 132 becomes closer.

In a first measurement mode, the measurement unit 121 of FIG. 1A applies an electrical signal to one of two lines selected from the horizontal electrode lines 131 of FIG. 1B, and measures a change in an electrical signal of the other line. The detection signal which is generated in the first measurement mode increases in magnitude in the order of a case of the operation nonexistence state, a case of the touch operation state, and a case of the grip operation state, and thus the operation state can be recognized.

In a second measurement mode, the measurement unit 121 of FIG. 1A applies an electrical signal to at least one of the horizontal electrode lines 131 of FIG. 1B, and measures a change in an electrical signal in at least one of the vertical electrode lines 132, to thereby generate a detection signal associated with the positions of the capacitance generation units 133. In the present embodiment, a relevant detection signal increases in magnitude as a capacitance generation unit 133 becomes closer to an operating finger.

When the measurement unit 121 operates in the first measurement mode, the determination unit 122 determines that the operation state is the operation nonexistence state or the operation existence state, on the basis of a difference between a base value described later and the detection signal. In a case where the operation state is the operation existence state, the determination unit 122 determines that the operation state is the touch operation state when there is a change in a local detection signal in a plurality of capacitance generation units 133 through the second measurement mode, and determines that the operation state is the grip operation state when there is no change in the local detection signal. Meanwhile, the determination of the operation state being the operation nonexistence state or the operation existence state and the determination of the operation state being the touch operation state and the grip operation state may be made using methods other than the aforementioned method. The details thereof have been hitherto known, and thus are not described herein.

In the present embodiment, the term "operation nonexistence period" as used herein indicates a period in which the determination by the determination unit 122 is the operation nonexistence state. The term "operation existence period" as used herein indicates a period in which the determination by the determination unit 122 is the operation existence state. The term "touch operation period" as used herein indicates a period in which the determination by the determination unit 122 is the touch operation state. The term "grip operation period" as used herein indicates a period in which the determination by the determination unit 122 is the grip operation state.

The base value storage unit 123 stores a base value. The term "base value" as used herein refers to a value following a change in a detection signal due to factors other than an operation. In the real usage environment, capacitance relevant to each of the capacitance generation units 133 changes even in a case where an operation is not performed in reality, and thus a detection signal also changes in association therewith. For example, in a case where the input device 100 is used in a vehicle, a drop in ambient temperature due to the influence of a cooler causes an increase in the detection signal. The difference of the detection signal from the base value is observed instead of observing only the detection signal, and thus a change due to factors, such as a change in temperature, other than an operation and a change due to the operation can be discriminated from each other in a change in the detection signal. The base value may be separately set for each capacitance generation unit 133, and may be set in association with a plurality of capacitance generation units 133.

The operation detection unit 124 detects detailed operation contents. Specifically, in the second measurement mode, which position a finger touches, how the finger moves, and the like are detected from the positions of the capacitance generation units 133 and a change in the detection signal. Detection results may be output to the outside.

The base value updating unit 125 updates the base value of the base value storage unit 123 on the basis of the detection signal which is output from the measurement unit 121.

In the operation nonexistence period, the base value updating unit 125 updates the base value periodically. Specifically, the base value updating unit 125 obtains the base value by taking the average of values weighted with at least one of the value of the present detection signal and the value of the past detection signal. A method of updating the base value in the operation nonexistence period is not limited thereto.

In the operation existence period, the base value updating unit 125 updates the base value by deriving a correction value for each predetermined time. Meanwhile, the base value updating unit 125 may update the base value every time the correction value is derived, and may update the base value at a different timing.

The input device 100 includes a first correction value deriving method in some of operation methods. The first correction value deriving method in the grip operation period of the operation existence period will be described with reference to a first flow 200 of FIG. 2. In the first correction value deriving method, the base value updating unit 125 of FIG. 1A uses an average detection value which is an average value of detection signals corresponding to all the capacitance generation units 133 of FIG. 1B. Meanwhile, in the derivation of the average detection value, some of the capacitance generation units 133 may be used rather than all the capacitance generation units 133. The influence of a local operation or noise is reduced by using the average detection value, and thus it is possible to more accurately follow a change in physical quantity due to a change in the environment.

When the determination by the determination unit 122 changes from the operation nonexistence state to the grip operation state, the base value updating unit 125 performs initialization in step 201. In the initialization, 0 is substituted into a correction value DT, 0 is substituted into a difference D_DT, and a current average detection value AD is substituted into an old average detection value OLD_AD.

As described later, when the base value is updated, the correction value DT is added to the base value which has been previously updated. The current average detection value AD stores an average detection value at a certain point in time. The old average detection value OLD_AD stores an average detection value before the certain point in time. The difference D_DT indicates how much the current average detection value AD changes with respect to the old average detection value OLD_AD.

Next, in step 202, the base value updating unit 125 determines whether the difference D_DT is equal to or greater than a threshold TH1. In a case where the difference D_DT is equal to or greater than the threshold TH1, the first flow 200 is terminated. In a case where the difference D_DT is not equal to or greater than the threshold TH1, the base value updating unit 125 executes step 203.

The difference D_DT indicates a change in the average detection value per predetermined time as described later. As compared to the magnitude of a change in the average detection value due to noise or an operation, the magnitude of a change in the average detection value according to a change in temperature is gradual. The threshold TH1 is set as a boundary between a change in the average detection value due to noise or an operation and a change in the average detection value according to a change in temperature. In the present embodiment, a predetermined range in which a change in the average detection value is determined to be a change according to a change in temperature is set to be less than the threshold TH1, but may be equal to or less than the threshold TH1.

That is, in step 202, in a case where a change in the average detection value per predetermined time is that corresponding to noise or an operation, the process is terminated. In a case where a change in the average detection value per predetermined time is that corresponding to a change in temperature, the process is continued.

In step 203, the base value updating unit 125 determines whether a predetermined time has elapsed from a point in time of updating of a previous difference D_DT. In a case where the predetermined time has not elapsed, the base value updating unit 125 returns to step 202. In a case where the predetermined time has elapsed, the base value updating unit 125 executes step 204.

In step 204, the base value updating unit 125 substitutes a value obtained by subtracting the old average detection value OLD_AD from the current average detection value AD into the difference D_DT. The elapse of the predetermined time is waited for in step 203, and thus the difference D_DT indicates a value close to a change in the average detection value per predetermined time. Meanwhile, a change in the average detection value per unit time may be used by dividing the predetermined time into the difference D_DT.

Next, in step 205, the base value updating unit 125 substitutes the current average detection value AD into the old average detection value OLD_AD.

Next, in step 206, the base value updating unit 125 determines whether the difference D_DT is equal to or less than the threshold TH1. In a case where the difference D_DT is not equal to or less than the threshold TH1, the base value updating unit 125 executes step 208. In a case where the difference D_DT is equal to or less than the threshold TH1, the base value updating unit 125 executes step 207.

In step 207, the base value updating unit 125 updates the correction value DT by adding the difference D_DT to the correction value DT, and proceeds to step 208. In a case where the difference D_DT is not equal to or less than the threshold TH1, step 207 is not performed, and thus the influence of noise or an operation does not influence the correction value DT. Therefore, it is possible to update the base value more accurately.

In step 208, the base value updating unit 125 returns to step 202 in a case where the determination by the determination unit 122 is the grip operation state, and terminates the first flow 200 in a case where the determination by the determination unit 122 is not the grip operation state.

Meanwhile, in the first flow 200, the correction value DT is set to 0 only in step 201. For this reason, the base value updating unit 125 updates the base value at any time by adding the derived correction value DT to the base value at a point in time of starting of the grip operation period. Meanwhile, the base value updating unit 125 may update the base value to a value obtained by adding the derived correction value DT to the previously updated base value by setting the correction value DT to zero every time the base value is updated. The base value updating unit 125 may further update the base value at a separate frequency. It is possible to more accurately follow a change in physical quantity due to a change in the environment by updating the base value over time during the operation existence period.

Figure 3A:
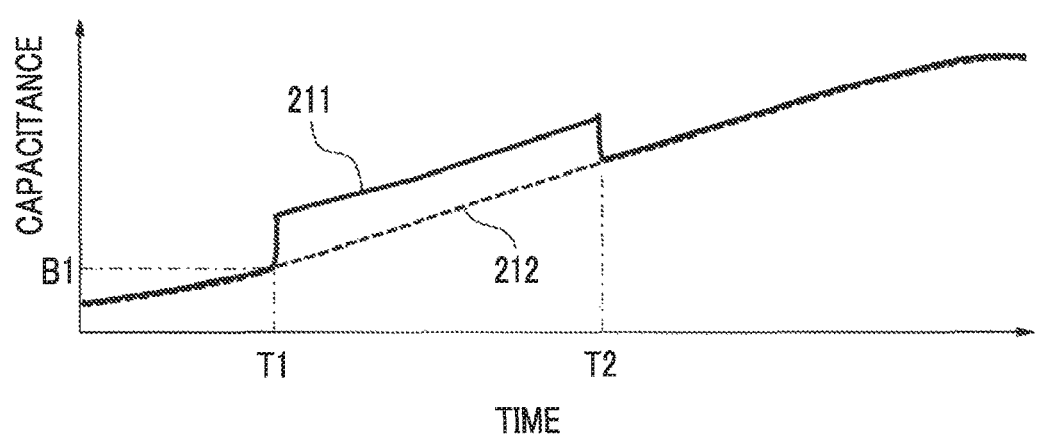
FIG. 3A is a graph illustrating an execution result example of the first correction value deriving method shown in FIG. 2.

FIG. 3A shows a first exemplary detection signal 211 and a first exemplary base value 212 in a case where a certain exemplary operation is performed under the environment of a drop in ambient temperature. The first exemplary detection signal 211 is a detection signal which is output from the measurement unit 121 in the first measurement mode. The first exemplary base value 212 is a base value which is corrected using the correction value derived on the basis of the first correction value deriving method.

Meanwhile, in FIGS. 3A, 3B, 5, 7A and 7B, the vertical axes represent capacitance, but mean that the base value and the average detection value are changed corresponding to an increase or decrease in capacitance, and it is not necessarily required for the base value and the average detection value to indicate the capacitance itself.

In FIG. 3A, a period before time T1 is the operation nonexistence period. In the operation nonexistence period, the base value is updated on the basis of the method of updating the base value in the operation nonexistence period. Therefore, in the operation nonexistence period, following a rise in the first exemplary detection signal 211 due to the influence of a drop in temperature, the first exemplary base value 212 also rises similarly.

In FIG. 3A, a period after time T1 and before time T2 is the grip operation period. After time T1 and before time T2, the base value is corrected using the amount of correction which is derived in accordance with the first correction value deriving method shown in FIG. 2. Following a rise in the first exemplary detection signal 211 due to the influence of a drop in temperature, the first exemplary base value 212 also rises similarly. Therefore, the first exemplary detection signal 211 and the first exemplary base value 212 maintain an approximately constant difference. Since there is not a great change in the first exemplary detection signal 211 after time T1 and before time T2, a change in the first exemplary detection signal 211 and a change in the first exemplary base value 212 become substantially the same as each other.

In FIG. 3A, an operation is terminated at time T2. When the base value is not updated in a state of a base value B1 at time T1 as in the related art, the first exemplary detection signal 211 does not drop to the base value B1 at time T2, and thus there may be concern of switching from the operation existence state to the operation nonexistence state not being recognized. According to the present embodiment, since the first exemplary base value 212 is updated at any time, the first exemplary detection signal 211 drops to the first exemplary base value 212, and thus there is a tendency for switching from the operation existence state to the operation nonexistence state to be recognized.

Figure 3B:
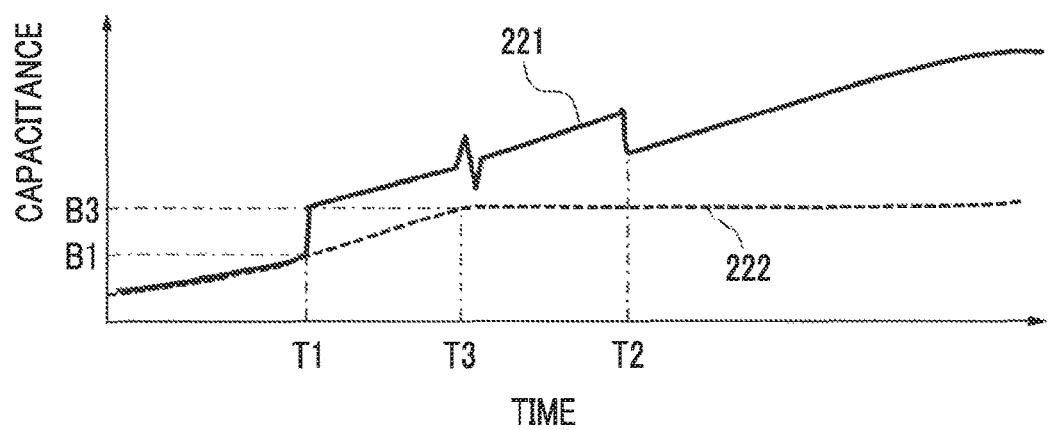
FIG. 3B is a graph illustrating another execution result example of the first correction value deriving method shown in FIG. 2.

FIG. 3B shows a second exemplary detection signal 221 and a second exemplary base value 222 in a case where a certain exemplary operation is performed under the environment of a drop in ambient temperature. The second exemplary detection signal 221 has the same change as that in the first exemplary detection signal 211 of FIG. 3A until time T3 between time T1 and time T2. The second exemplary detection signal 221 changes greatly at time T3 due to noise or an operation. As shown in step 202 of FIG. 2, when the difference D_DT is determined to be equal to or greater than the threshold TH1, the derivation of the correction value DT is terminated. Therefore, as shown in FIG. 3B, the second exemplary base value 222 maintains a base value B3 updated immediately before time T3.

According to the present embodiment, the second exemplary detection signal 221 does not drop to the base value B3 at time T2, and thus there may be concern of switching from the operation existence state to the operation nonexistence state not being recognized. However, since the base value is updated at any time until noise or an operation occurs, there is more of a tendency for switching from the operation existence state to the operation nonexistence state to be recognized than in the related art. According to the present embodiment, the base value can be updated during the operation existence period, and thus it is possible to reduce the erroneous determination of an operation even when a physical quantity which is measured during the operation existence period changes due to a change in the environment. The influence of local noise or an operation is reduced by using physical quantities of a plurality of positions, and thus it is possible to update the base value more accurately.

Second Embodiment

Next, an input device of a second embodiment will be described. The input device of the second embodiment has the same structure as that of the input device 100 of the first embodiment shown in FIGS. 1A and 1B, but has a difference in a correction value deriving method of operation methods. Hereinafter, a description will be given with a focus on differences between the first correction value deriving method of the first embodiment and a second correction value deriving method of the second embodiment.

A second flow 300 of FIG. 4 shows the second correction value deriving method in the grip operation period of the operation existence period. Operations in step 301, step 302, step 303, step 304, step 305, step 306, step 307, and step 308 are the same as the operations in step 201, step 202, step 203, step 204, step 205, step 206, step 207, and step 208 of the first flow 200 of FIG. 2, in order.

However, the first flow 200 of FIG. 2 is terminated in a case where the difference D_DT is equal to or greater than the threshold TH1 in step 202, but the second flow 300 of FIG. 4 proceeds to step 308 in a case where the difference D_DT is equal to or greater than the threshold TH1 in step 302. That is, in the second correction value deriving method, in a case where a change in the average detection value per predetermined time is that corresponding to noise or an operation, the average detection value in that case is not used simply in the derivation of the correction value DT, and the derivation of the correction value DT is still continued after that. As a result, the updating of the base value is also continued.

Figure 5:
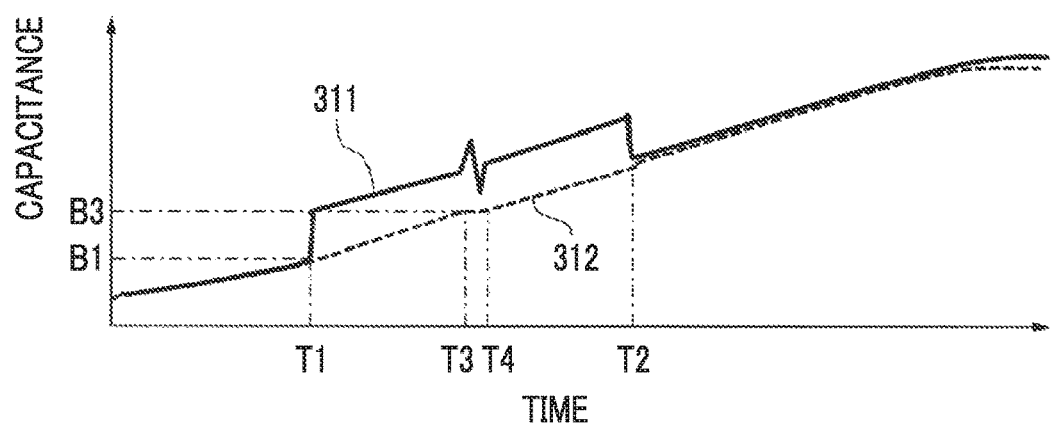
FIG. 5 is a graph illustrating an execution result example of the second correction value deriving method shown in FIG. 4.

FIG. 5 shows a third exemplary detection signal 311 and a third exemplary base value 312 in a case where a certain exemplary operation is performed under the environment of a drop in ambient temperature. The third exemplary detection signal 311 of FIG. 5 is the same change as that in the second exemplary detection signal 221 of FIG. 3B. The third exemplary base value 312 of FIG. 5 and the second exemplary base value 222 of FIG. 3B have the same change until time T3 at which the third exemplary detection signal 311 changes greatly, but have different changes after time T3. As shown in step 302 of FIG. 4, when the difference D_DT is determined to be equal to or greater than the threshold TH1, the average detection value in that case is not used in the derivation of the correction value DT. Therefore, the base value B3 immediately before time T3 is maintained even after time T3. However, the derivation of the correction value DT is still continued after that. Therefore, when the difference D_DT is determined not to be equal to or greater than the threshold TH1 at time T4, a new correction value DT is derived, and the base value can be updated. Since the correction value DT is not derived after time T3 and before time T4, the base value becomes inaccurate, but its inaccuracy decreases as the period becomes shorter.

According to the present embodiment, since the base value is updated at any time during the operation existence period, there is more of a tendency for switching from the operation existence state to the operation nonexistence state to be recognized than in the related art. According to the present embodiment, the base value can be updated during the operation existence period, and thus it is possible to reduce the erroneous determination of an operation even when a physical quantity which is measured during the operation existence period changes due to a change in the environment. Since the base value can be updated even after an operation or noise occurs, it is possible to reduce the erroneous determination of an operation over a longer period of time.

Third Embodiment

Next, an input device of a third embodiment will be described. The input device of the third embodiment has the same structure as that of the input device 100 of the first embodiment shown in FIGS. 1A and 1B, but has a difference in a correction value deriving method of operation methods. Hereinafter, a third correction value deriving method which is performed by the input device of the third embodiment in the touch operation period of the operation existence period will be described with reference to a third flow 400 of FIG. 6.

In the third correction value deriving method, the base value updating unit 125 of FIG. 1A uses a minimum detection value which is a minimum value of the detection signals corresponding to all the capacitance generation units 133 of FIG. 1B. Meanwhile, the minimum detection value may be selected from some of the capacitance generation units 133. The detection signal from a capacitance generation unit 133 having a small influence of an operation or noise is used by using the minimum detection value, and thus it is possible to more accurately follow a change in physical quantity due to a change in the environment.

When the determination by the determination unit 122 changes from the operation nonexistence state to the touch operation state, the base value updating unit 125 performs initialization in step 401. In the initialization, 0 is substituted into a correction value DT, and 0 is substituted into a difference D_DT, and a current minimum detection value ΔAD is substituted into an old minimum detection value OLD_ΔAD.

As described later, when the base value is updated, the correction value DT is added to the base value which has been previously updated. The current minimum detection value ΔAD is a minimum value at a certain point in time among the detection signals corresponding to all the capacitance generation units 133. Therefore, the capacitance generation units 133 having generated the detection signal selected as the current minimum detection value ΔAD are not necessarily the same as each other at a different point in time. The old minimum detection value OLD_ΔAD stores a minimum detection value before the certain point in time. The difference D_DT indicates how much the current minimum detection value ΔAD changes with respect to the old minimum detection value OLD_ΔAD.

Next, in step 402, the base value updating unit 125 determines whether the difference D_DT is equal to or greater than the threshold TH1. In a case where the difference D_DT is equal to or greater than the threshold TH1, the third flow 400 proceeds to step 408. In a case where the difference D_DT is not equal to or greater than the threshold TH1, the base value updating unit 125 executes step 403.

The difference D_DT indicates a change in the minimum detection value per predetermined time as described later. As compared to the magnitude of a change in the minimum detection value due to noise or an operation, the magnitude of a change in the minimum detection value according to a change in temperature is gradual. The threshold TH1 is set as a boundary between a change in the minimum detection value due to noise or an operation and a change in the minimum detection value according to a change in temperature. In the present embodiment, a predetermined range in which a change in the minimum detection value is determined to be a change according to a change in temperature is set to be less than the threshold TH1, but may be equal to or less than the threshold TH1. That is, in a case where a change in the minimum detection value per predetermined time is that corresponding to noise or an operation, the minimum detection value in that case is not used in the derivation of the correction value DT.

In step 403, the base value updating unit 125 determines whether a predetermined time has elapsed from a point in time of updating of a previous difference D_DT. In a case where the predetermined time has not elapsed, the base value updating unit 125 returns to step 402. In a case where the predetermined time has elapsed, the base value updating unit 125 executes step 404.

In step 404, the base value updating unit 125 substitutes a value obtained by subtracting the old minimum detection value OLD_ΔAD from the current minimum detection value ΔAD into the difference D_DT. The elapse of the predetermined time waited for in step 403, and thus the difference D_DT indicates a value close to a change in the minimum detection value per predetermined time. Meanwhile, a change in the minimum detection value per unit time may be used by dividing the predetermined time into the difference D_DT.

Next, in step 405, the base value updating unit 125 substitutes the current minimum detection value ΔAD into the old minimum detection value OLD_ΔAD.

Next, in step 406, the base value updating unit 125 determines whether the difference D_DT is equal to or less than the threshold TH1. In a case where the difference D_DT is not equal to or less than the threshold TH1, the base value updating unit 125 executes step 408. In a case where the difference D_DT is equal to or less than the threshold TH1, the base value updating unit 125 executes step 407.

In step 407, the base value updating unit 125 updates the correction value DT by adding the difference D_DT to the correction value DT, and proceeds to step 408. In a case where the difference D_DT is not equal to or less than the threshold TH1, step 407 is not performed, and thus the influence of noise or an operation does not influence the correction value DT. Therefore, it is possible to update the base value more accurately.

In step 408, the base value updating unit 125 returns to step 402 in a case where the determination by the determination unit 122 is the touch operation state, and terminates the third flow 400 in a case where the determination by the determination unit 122 is not the touch operation state.

Meanwhile, in the third flow 400, the correction value DT is set to 0 only in step 401. For this reason, the base value updating unit 125 updates the base value at any time by adding the derived correction value DT to the base value at a point in time of starting of the touch operation period. Meanwhile, the base value updating unit 125 may update the base value to a value obtained by adding the derived correction value DT to the previously updated base value by setting the correction value DT to zero every time the base value is updated. The base value updating unit 125 may further update the base value at a separate frequency. It is possible to more accurately follow a change in physical quantity due to a change in the environment by updating the base value over time during the operation existence period.

Figure 7A:
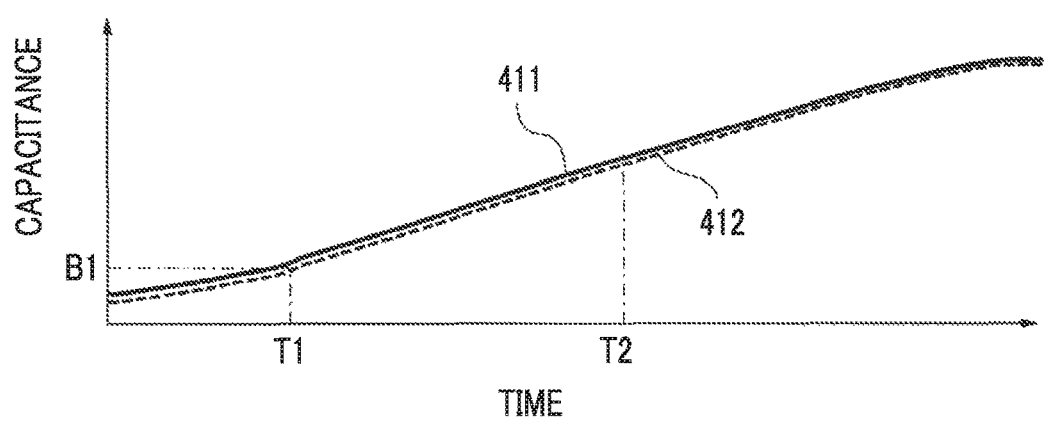
FIG. 7A is a graph illustrating an execution result example of the third correction value deriving method shown in FIG. 6.

FIG. 7A shows a fourth exemplary detection signal 411 and a fourth exemplary base value 412 in a case where a certain exemplary operation is performed under the environment of a drop in ambient temperature. The fourth exemplary detection signal 411 is a detection signal in the second measurement mode which corresponds to a position away from an operation position. The fourth exemplary base value 412 is a base value which is corrected using the correction value derived on the basis of the third correction value deriving method.

In FIG. 7A, a period before time T1 is the operation nonexistence period. In the operation nonexistence period, the base value is updated on the basis of the method of updating the base value in the operation nonexistence period. Therefore, in the operation nonexistence period, following a rise in the fourth exemplary detection signal 411 due to the influence of a drop in temperature, the fourth exemplary base value 412 also rises similarly.

In FIG. 7A, a period after time T1 and before time T2 is the touch operation period. After time T1 and before time T2, the base value is corrected using the amount of correction which is derived in accordance with the third correction value deriving method shown in FIG. 6. Following a rise in the fourth exemplary detection signal 411 due to the influence of a drop in temperature, the fourth exemplary base value 412 also rises similarly. Since there is not a great change after time T1 and before time T2, a change in the fourth exemplary detection signal 411 and a change in the fourth exemplary base value 412 become substantially the same as each other.

In FIG. 7A, an operation is terminated at time T2. According to the present embodiment, since the fourth exemplary base value 412 is updated at any time, a detection signal corresponding to an operation position which is not shown drops to the fourth exemplary base value 412, and thus there is a tendency for switching from the operation existence state to the operation nonexistence state to be recognized similarly to FIG. 3A.

Figure 7B:
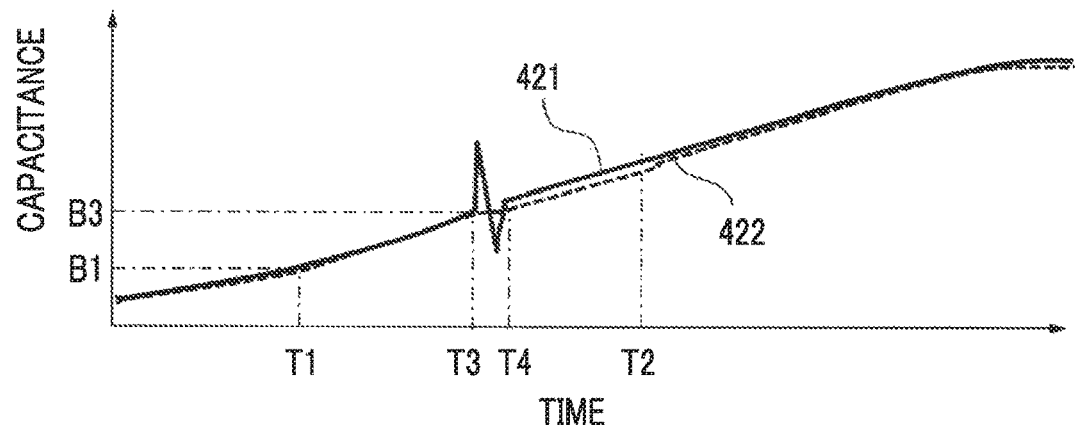
FIG. 7B is a graph illustrating another execution result example of the third correction value deriving method shown in FIG. 6.

FIG. 7B shows a fifth exemplary detection signal 421 and a fifth exemplary base value 422 in a case where a certain exemplary operation is performed under the environment of a drop in ambient temperature. The fifth exemplary detection signal 421 is a detection signal in the second measurement mode which corresponds to a separate position away from an operation position. The fifth exemplary detection signal 421 has the same change as that in the fourth exemplary detection signal 411 of FIG. 7A until time T3 between time T1 and time T2. The fifth exemplary detection signal 421 changes greatly due to noise or an operation at time T3. As shown in step 402 of FIG. 6, when the difference D_DT is determined to be equal to or greater than the threshold TH1, the minimum detection value in that case is not used in the derivation of the correction value DT. Therefore, the base value B3 immediately before time T3 is maintained even after time T3. However, the derivation of the correction value DT is still continued after that. Therefore, when the difference D_DT is determined not to be equal to or greater than the threshold TH1 at time T4, a new correction value DT is derived, and the base value can be updated. Since the correction value DT is not derived after time T3 and before time T4, the base value becomes inaccurate, but its inaccuracy decreases as the period becomes shorter.

According to the present embodiment, since the base value is updated at any time during the operation existence period, there is more of a tendency for switching from the operation existence state to the operation nonexistence state to be recognized than in the related art. According to the present embodiment, the base value can be updated during the operation existence period, and thus it is possible to reduce the erroneous determination of an operation even when a physical quantity which is measured during the operation existence period changes due to a change in the environment. According to the present embodiment, the influence of local noise or an operation is reduced by using physical quantities of a plurality of positions, and thus it is possible to update the base value more accurately.

The present invention is not limited to the aforementioned embodiments. That is, those skilled in the art may variously change, combine, sub-combine, and substitute the components of the aforementioned embodiment within the technical scope of the present invention or its equivalents.

In the present specification, a physical quantity relevant to capacitance in the capacitance generation unit 133 is measured, but other physical quantities may be measured. The value of the detection signal which is used in updating the base value may be other than the average detection value and the minimum detection value.

The present invention can be applied to an input device using an operation such as touch or proximity. For example, the present invention can be applied to an input device which is mounted in a vehicle.

It should be understood by those skilled in the art that various modifications, combinations, sub-combinations and alterations may occur depending on design requirements and other factors insofar as they are within the scope of the appended claims or the equivalents thereof.

What is claimed is:

1. An input device for detecting an operation of an operating object, the input device comprising:
   an operating unit on which the operating object performs the operation, the operation including at least one of touching and approaching of the operating object;
   a measurement unit configured to measure a physical quantity corresponding the operation of the operating object onto the operating unit;
   a determination unit configured to determine if the operating unit is in an operation ongoing state or a no-operation state, based on at least the physical quantity and a base value; and
   a base value updating unit configured to update the base value using the physical quantity during an operation ongoing period in which the operating unit is in the ongoing operation state, if a magnitude of a change in the measured physical quantity per predetermined time period is within a predetermined range,
   wherein during the operation ongoing period, the base value updating unit updates the base value further using a previous base value which has been previously updated during the operation ongoing period and a correction value which is obtained by accumulating a difference in the physical quantities measured at different points in time,
   and wherein the base value updating unit terminates the updating during the operation ongoing period if the magnitude of the change in the physical quantity per predetermined time period falls outside of the predetermined range.

2. An input device for detecting an operation of an operating object, the input device comprising:
   an operating unit on which the operating object performs the operation, the operation including at least one of touching and approaching of the operating object;
   a measurement unit configured to measure a physical quantity corresponding the operation of the operating object onto the operating unit;

a determination unit configured to determine if the operating unit is in an operation ongoing state or a no-operation state, based on at least the physical quantity and a base value; and a base value updating unit configured to update the base value using the physical quantity during an operation ongoing period in which the operating unit is in the ongoing operation state, if a magnitude of a change in the measured physical quantity per predetermined time period is within a predetermined range, wherein during the operation ongoing period, the base value updating unit updates the base value further using a previous base value which has been previously updated during the operation ongoing period and a correction value which is obtained by accumulating a difference in the physical quantities measured at different points in time, and wherein the base value updating unit does not use the physical quantity in updating the base value if the magnitude of the change in the physical quantity per predetermined time period falls outside of the predetermined range, and continues the updating even after the magnitude of the change in the physical quantity per predetermined time period falls outside of the predetermined range.

3. The input device according to claim 2, wherein the measurement unit measures each of the physical quantities at a plurality of positions,
the determination unit determines an operation state of the operating unit using at least one of the physical quantities at the plurality of positions, and
the base value updating unit updates the base value using at least one of the physical quantities at the plurality of positions.

4. The input device according to claim 3, wherein the base value updating unit updates the base value using a minimum value of differences between the physical quantities at the plurality of positions and the base value.

5. The input device according to claim 4, wherein the operating unit includes a plurality of capacitance generation units each having a capacitance which varies in accordance with the operation onto the operating unit, wherein the plurality of positions are disposed in a matrix, and the measurement unit measures the capacitance as the physical quantity.

6. The input device according to claim 5, wherein during a no-operation period in which the operating unit is in the no-operation state, the base value updating unit updates the base value based on at least the physical quantity and the base value which has been previously updated during the no-operation period.

* * * * *